United States Patent
Forcella et al.

[11] 3,985,223
[45] Oct. 12, 1976

[54] UNIVERSAL GRIPPER ASSEMBLY FOR FROZEN CONFECTIONS

[75] Inventors: Peter W. Forcella, Los Gatos; Donald S. Meek, Saratoga; Gary D. French, San Jose, all of Calif.

[73] Assignee: FMC Corporation, San Jose, Calif.

[22] Filed: Sept. 22, 1975

[21] Appl. No.: 615,879

[52] U.S. Cl. ............... 198/479; 198/696; 214/1 BA; 425/93; 198/377; 198/406
[51] Int. Cl.² ........................ B65G 17/42
[58] Field of Search ............ 198/19, 238, 240, 243, 198/179; 214/1 BA; 425/90, 93, 104, 114

[56] References Cited
UNITED STATES PATENTS

| | | | |
|---|---|---|---|
| 928,172 | 7/1909 | Bernardin | 198/179 X |
| 2,532,849 | 12/1950 | Manaseri | 198/179 X |
| 2,976,984 | 3/1961 | Moncrieff | 198/179 |
| 3,144,121 | 8/1964 | Smith | 197/243 |
| 3,198,312 | 8/1965 | Loveland | 198/243 |
| 3,580,188 | 5/1971 | Lutsey | 425/93 X |
| 3,590,982 | 7/1971 | Banyas | 198/179 |
| 3,648,625 | 3/1972 | Glass | 425/93 |
| 3,760,930 | 9/1973 | Reichert | 198/179 X |
| 3,794,197 | 2/1974 | Stragier | 198/179 X |
| 3,877,569 | 4/1975 | Shields | 198/243 |

FOREIGN PATENTS OR APPLICATIONS

| | | | |
|---|---|---|---|
| 1,238,722 | 7/1971 | United Kingdom | 198/240 |

Primary Examiner—Evon C. Blunk
Assistant Examiner—R. K. Thomson
Attorney, Agent, or Firm—C. E. Tripp; R. B. Catto

[57] ABSTRACT

A series of articulated product gripper mechanisms are mounted on a continuously operating pickup conveyor having a reach adjacent the product transfer zone of a continuously operating transport conveyor that has cold plates running through a freezing tunnel. The gripper mechanisms are employed to transfer frozen confections such as ice cream bars, ice cream cones, ice cream cups, and stickless or stick novelties from the transport conveyor cold plates to the pickup conveyor. Each gripper mechanism includes replaceable gripping tongs or fingers appropriate to the particular type of confection being handled, and is operable to pick up the moving confection, invert and dip the confection in a coating bath and in a dry confection applicator, and release the coated confection in predetermined orientation onto the inlet conveyor of an associated wrapping machine. The pickup conveyor is elevationally adjustable for accurately positioning the gripper mechanisms relative to the cold plates; this adjustment capability is related to the universal adaptability of the gripper mechanisms to different types of products such as ice cream or bars, and also to different thickness bar type products, both stick type and stickless.

11 Claims, 26 Drawing Figures

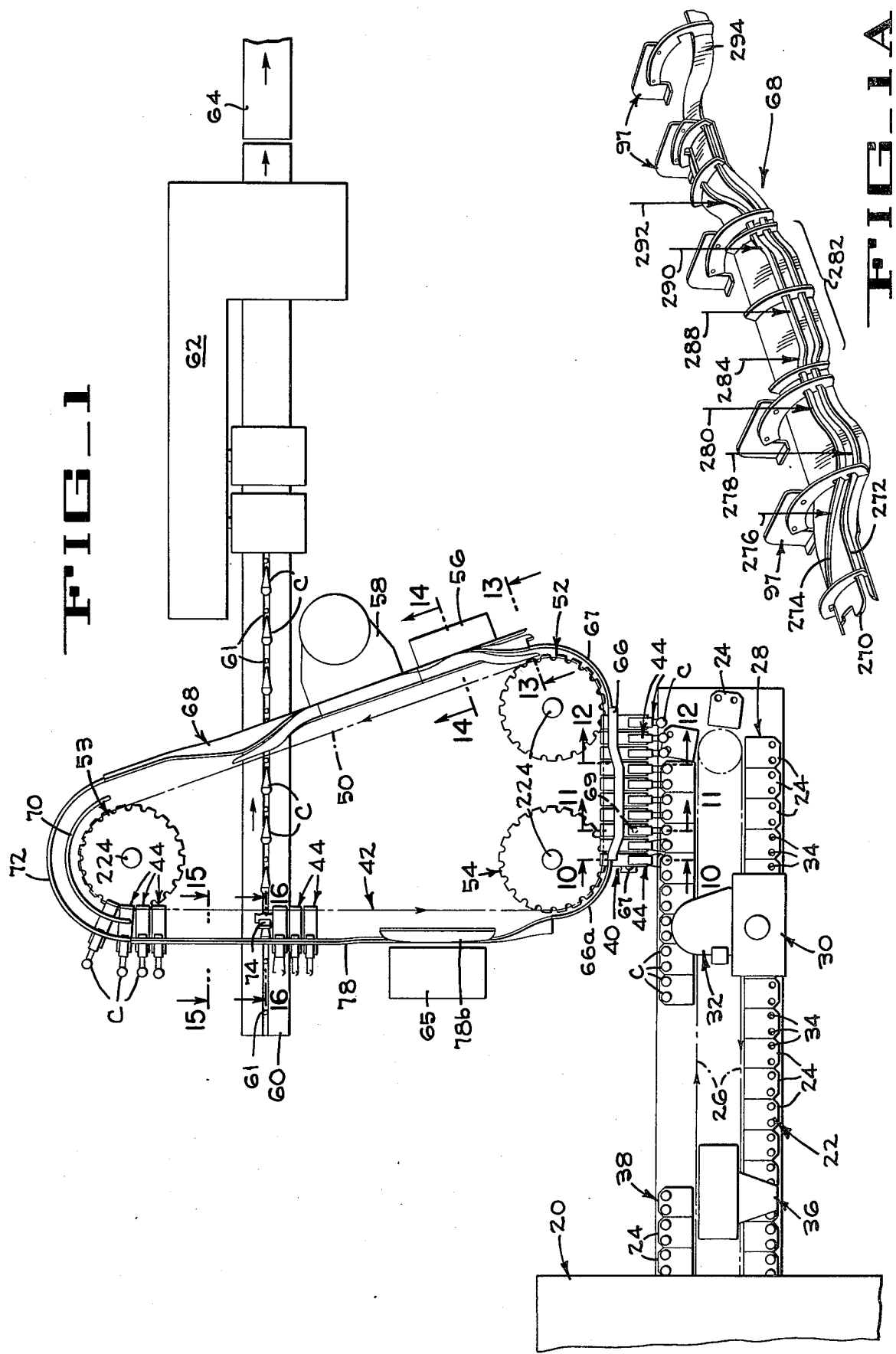

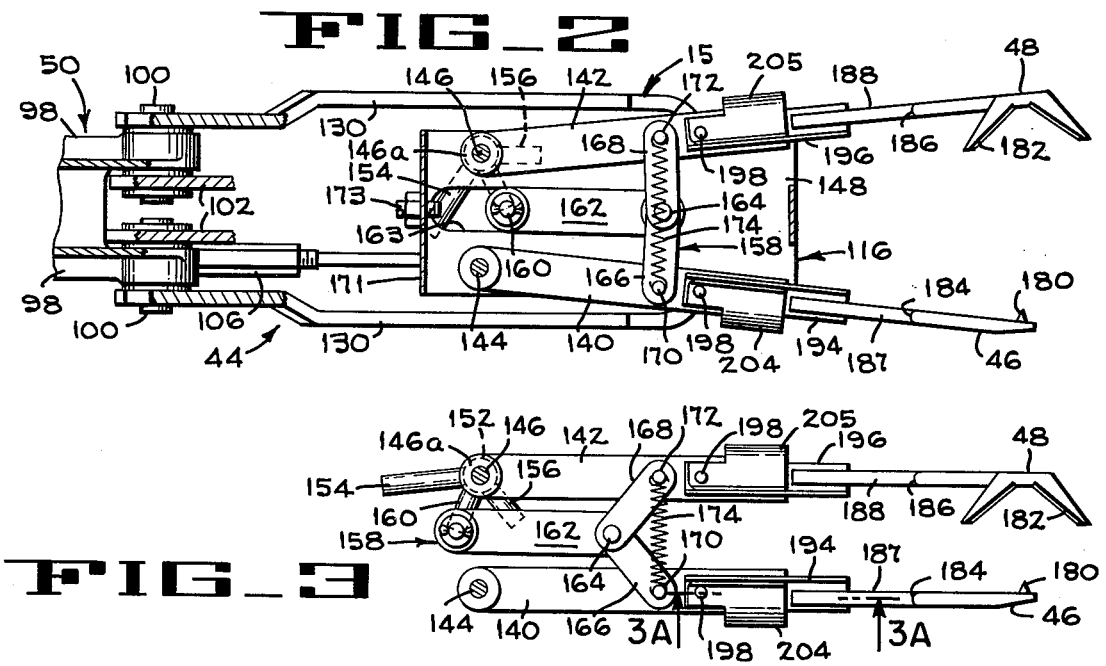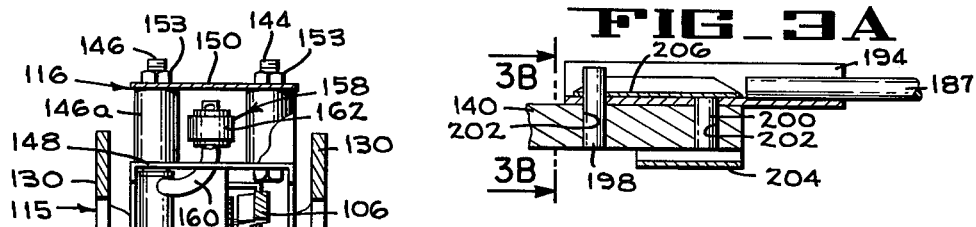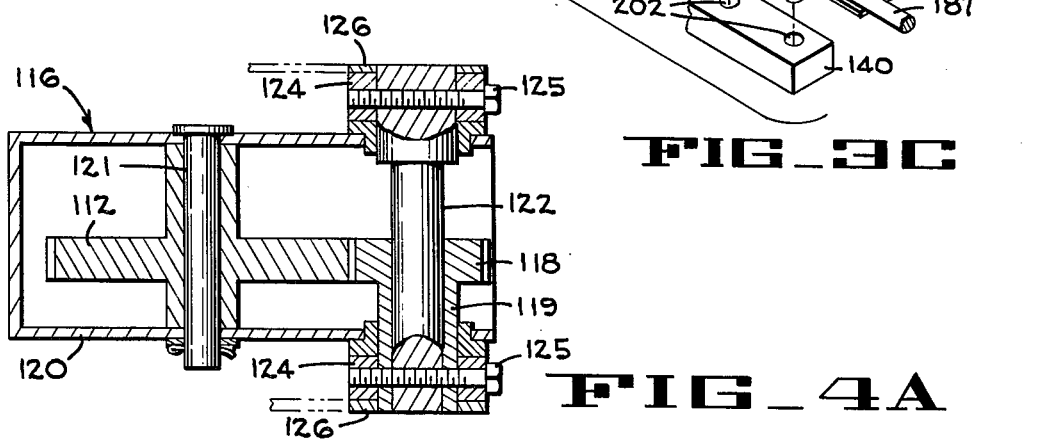

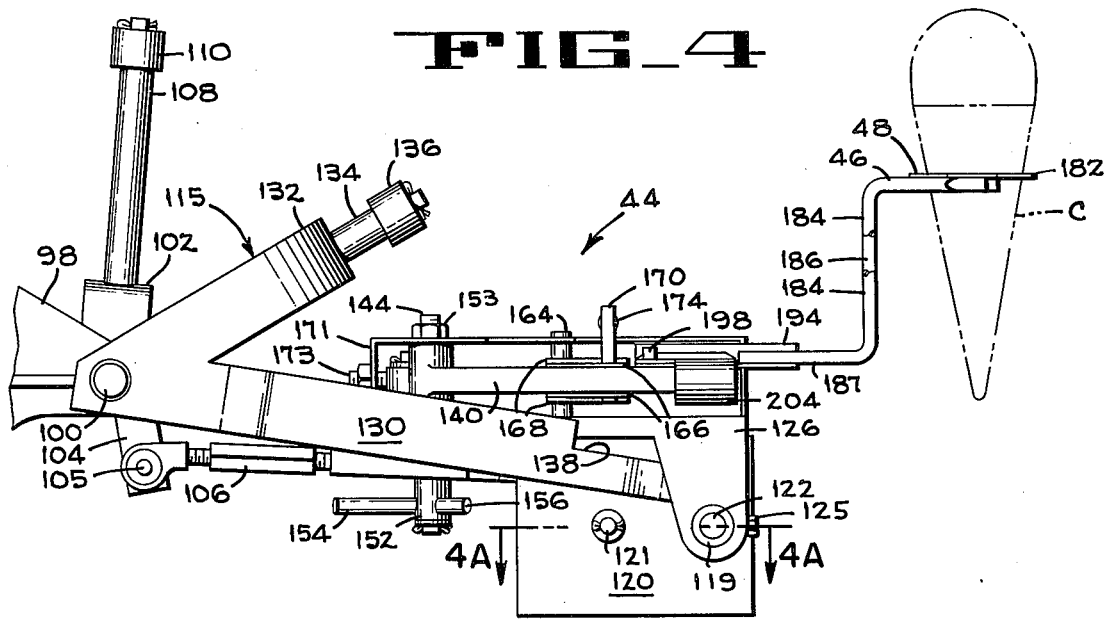
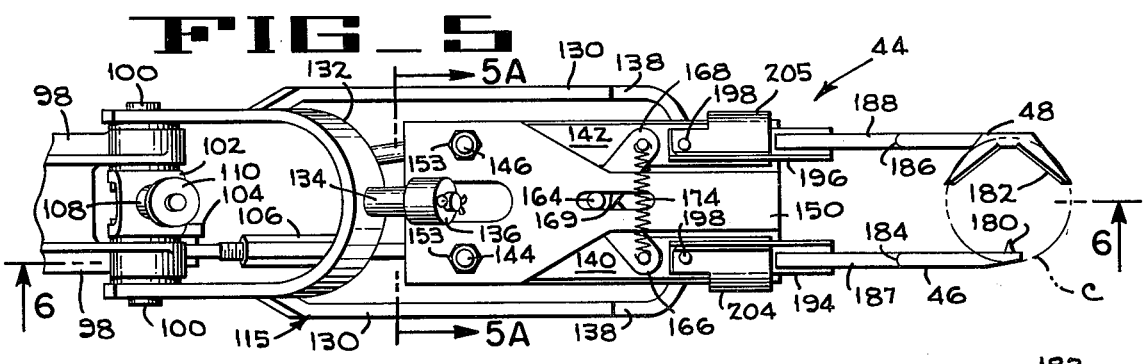
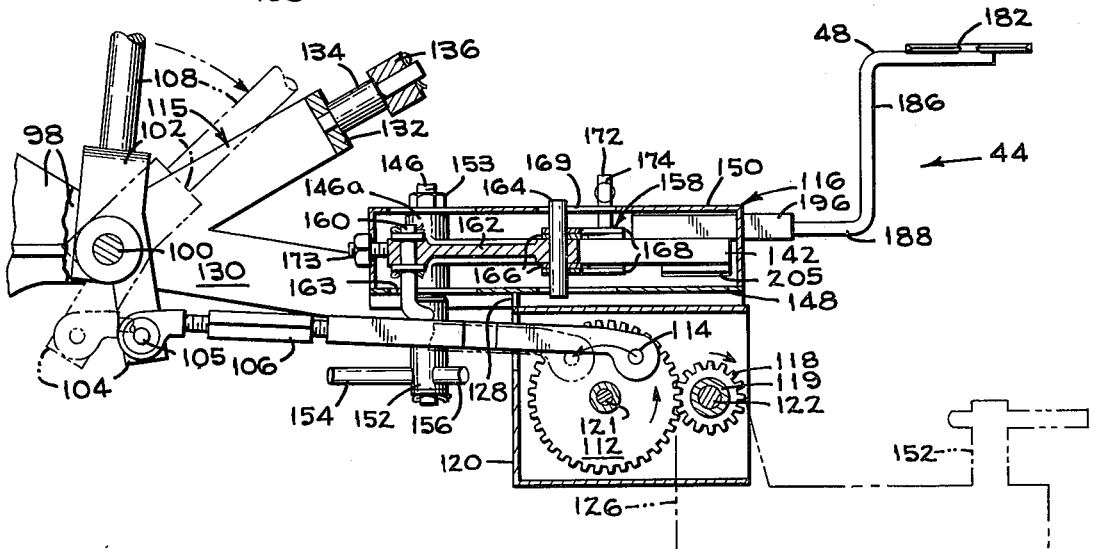
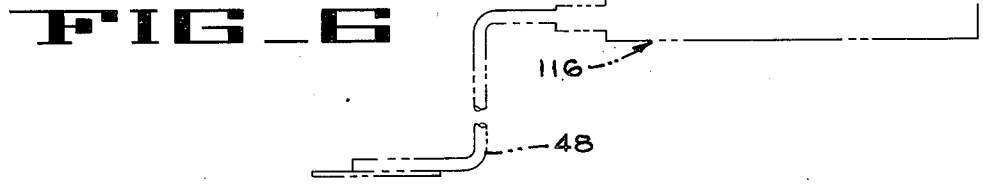

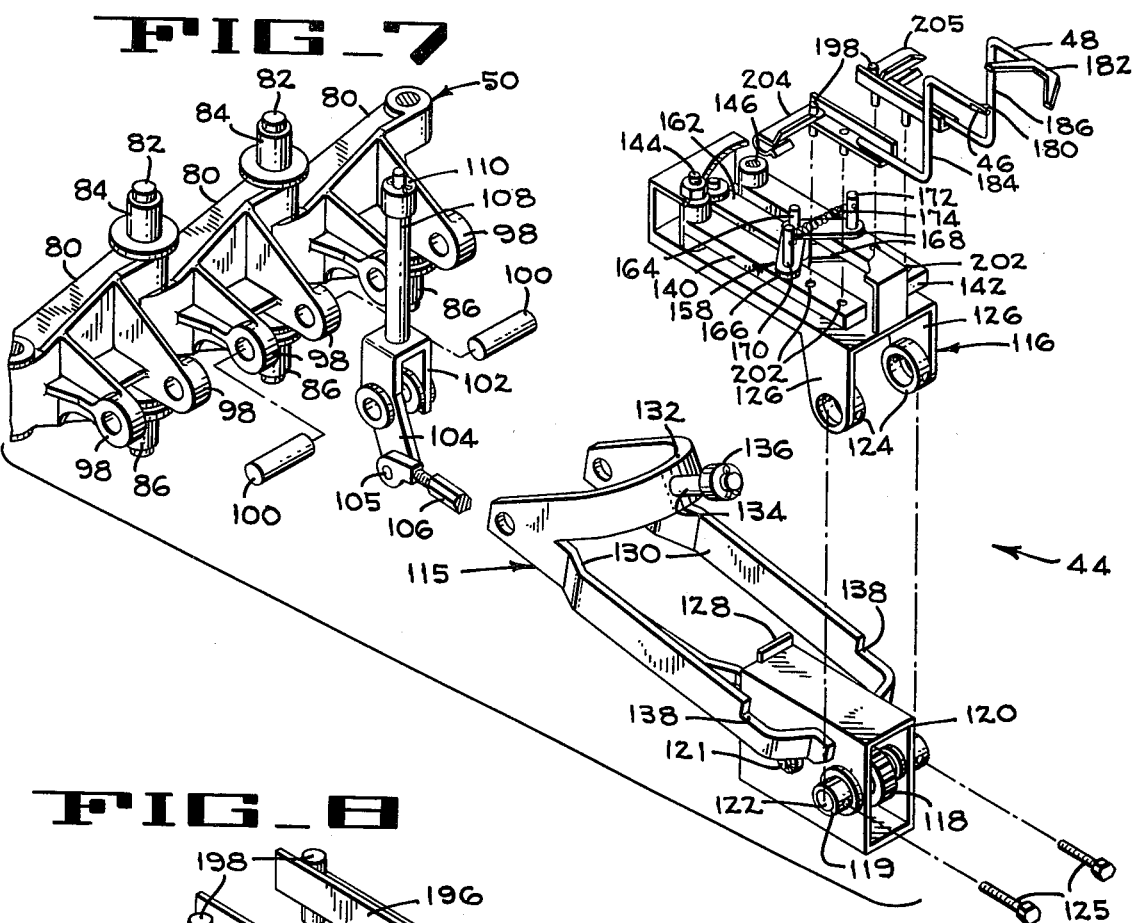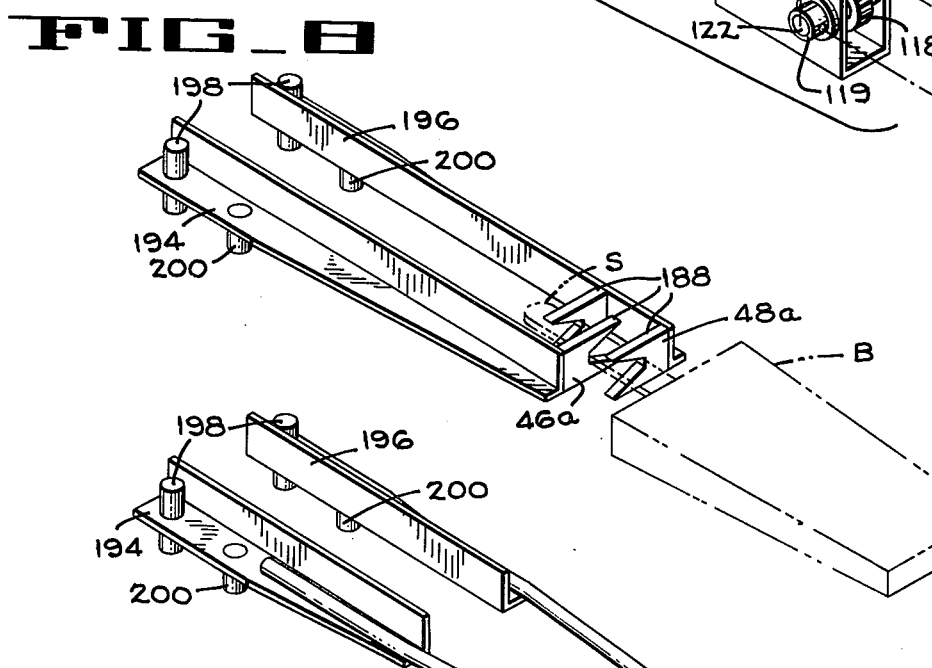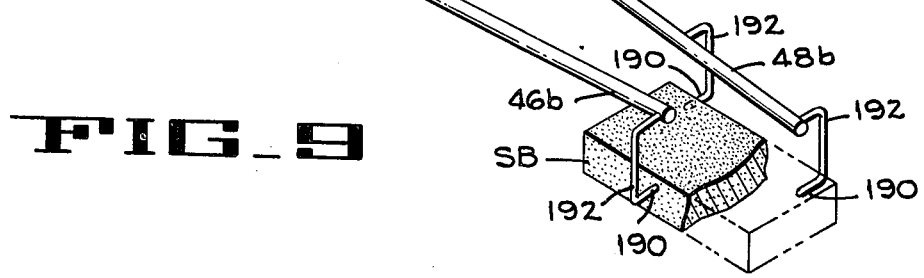

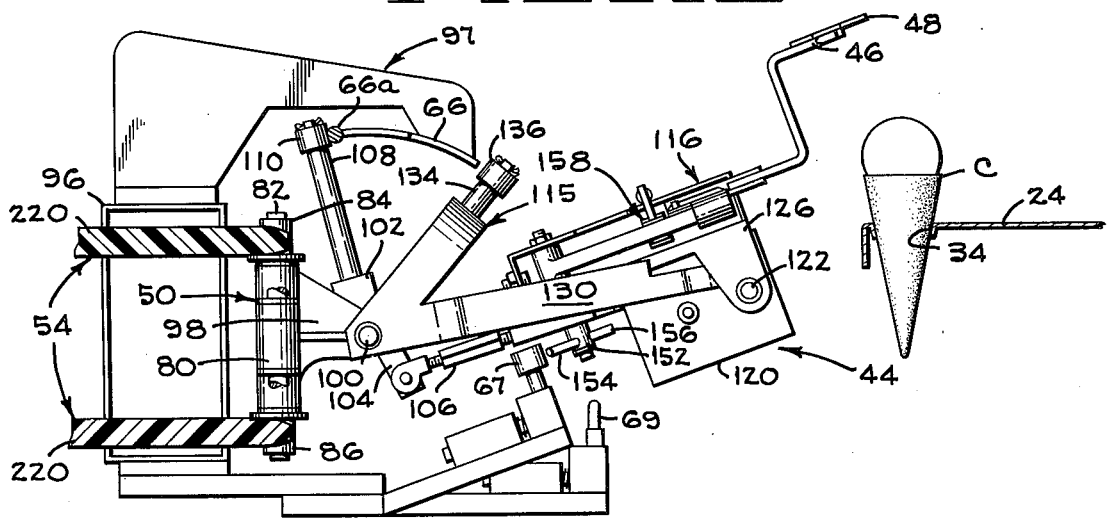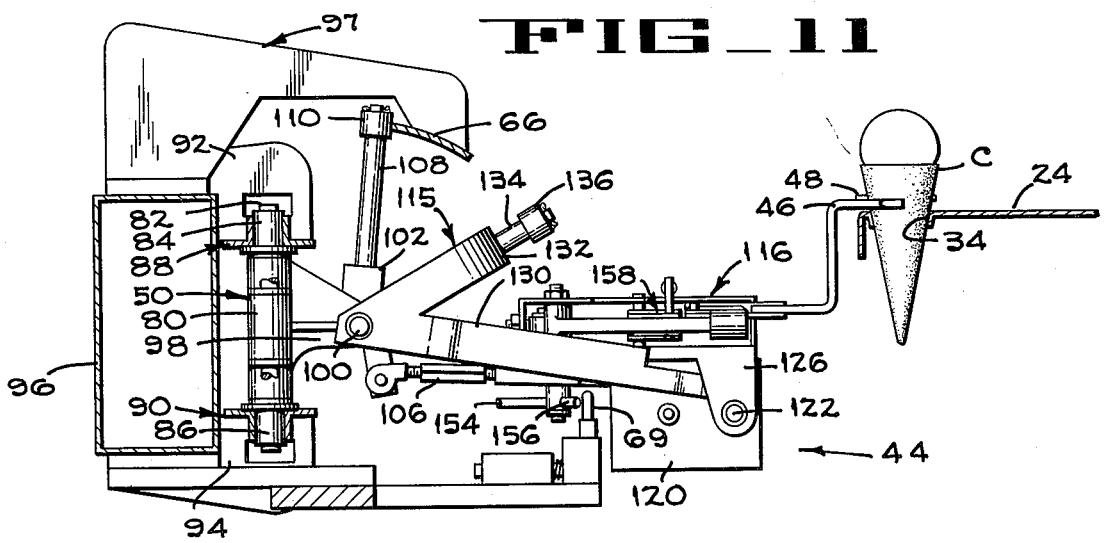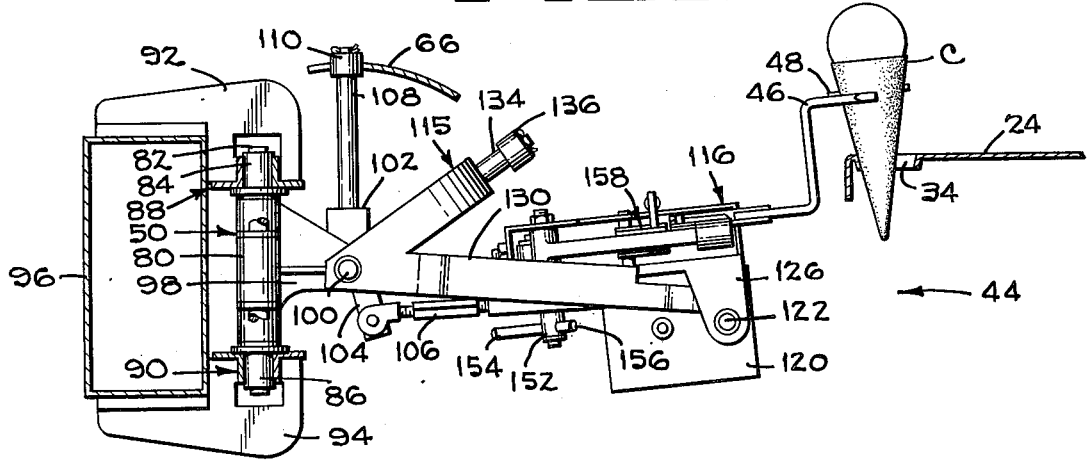

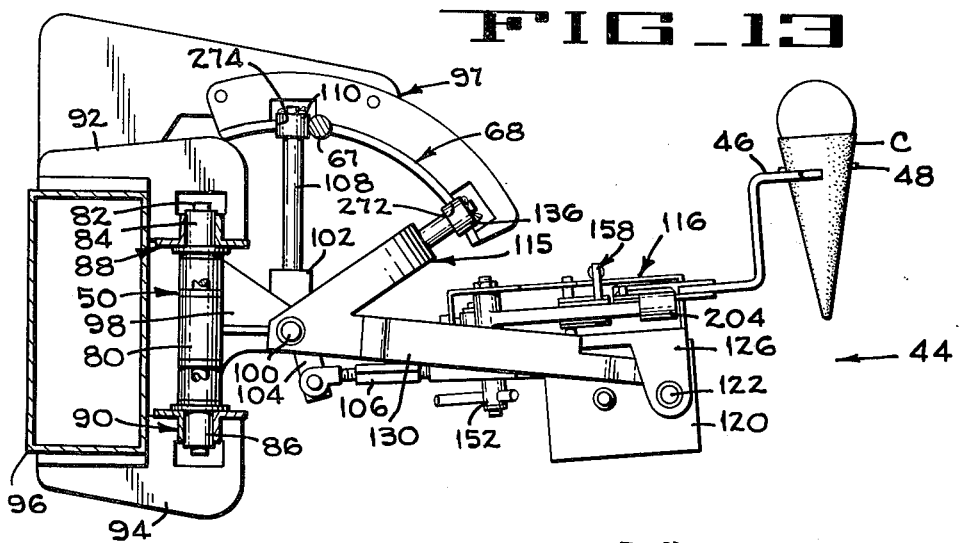
FIG_13
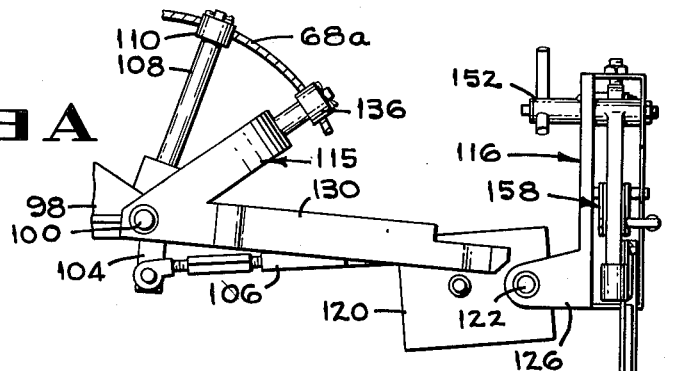
FIG_13A
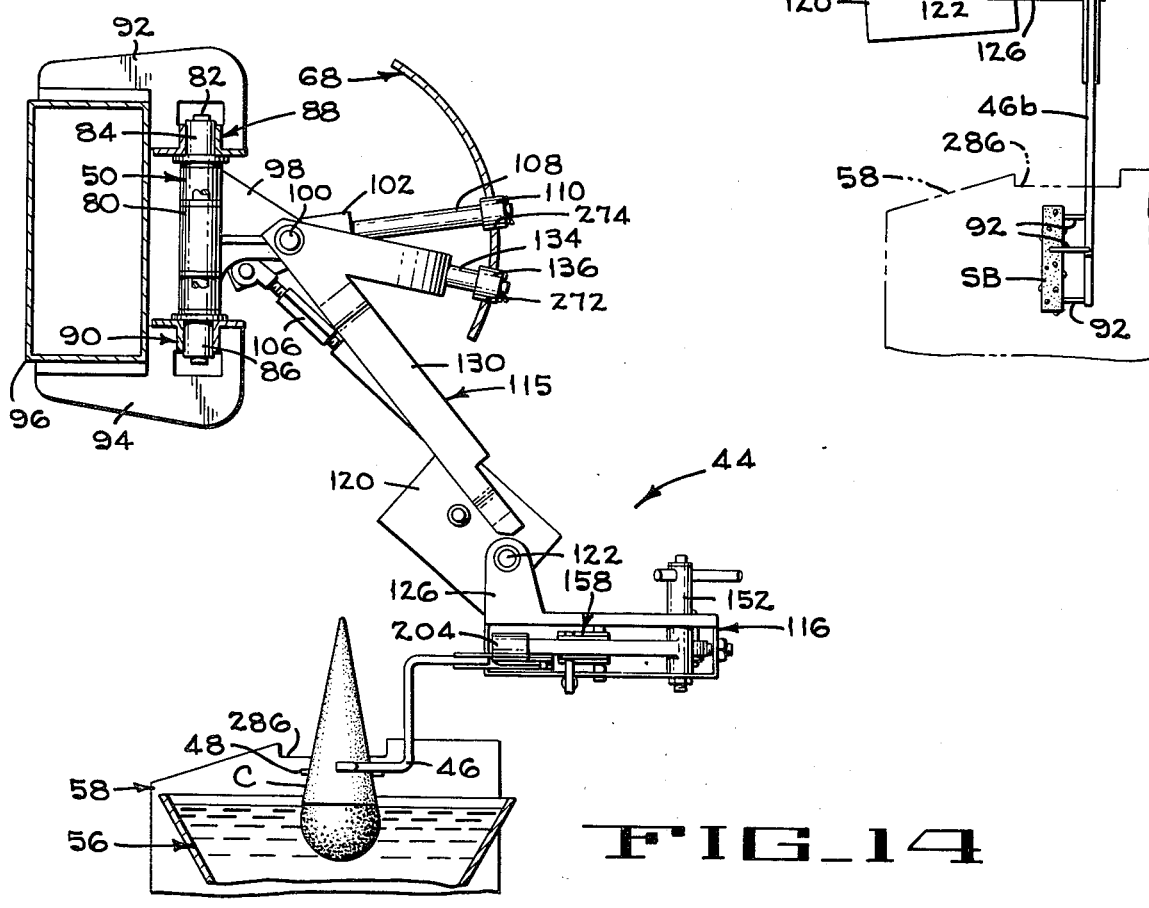
FIG_14

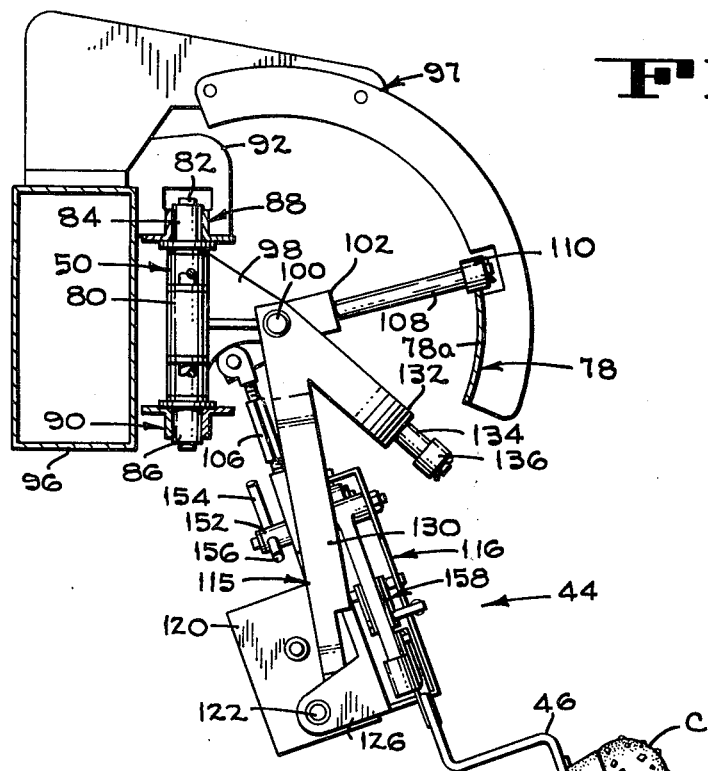
FIG_15
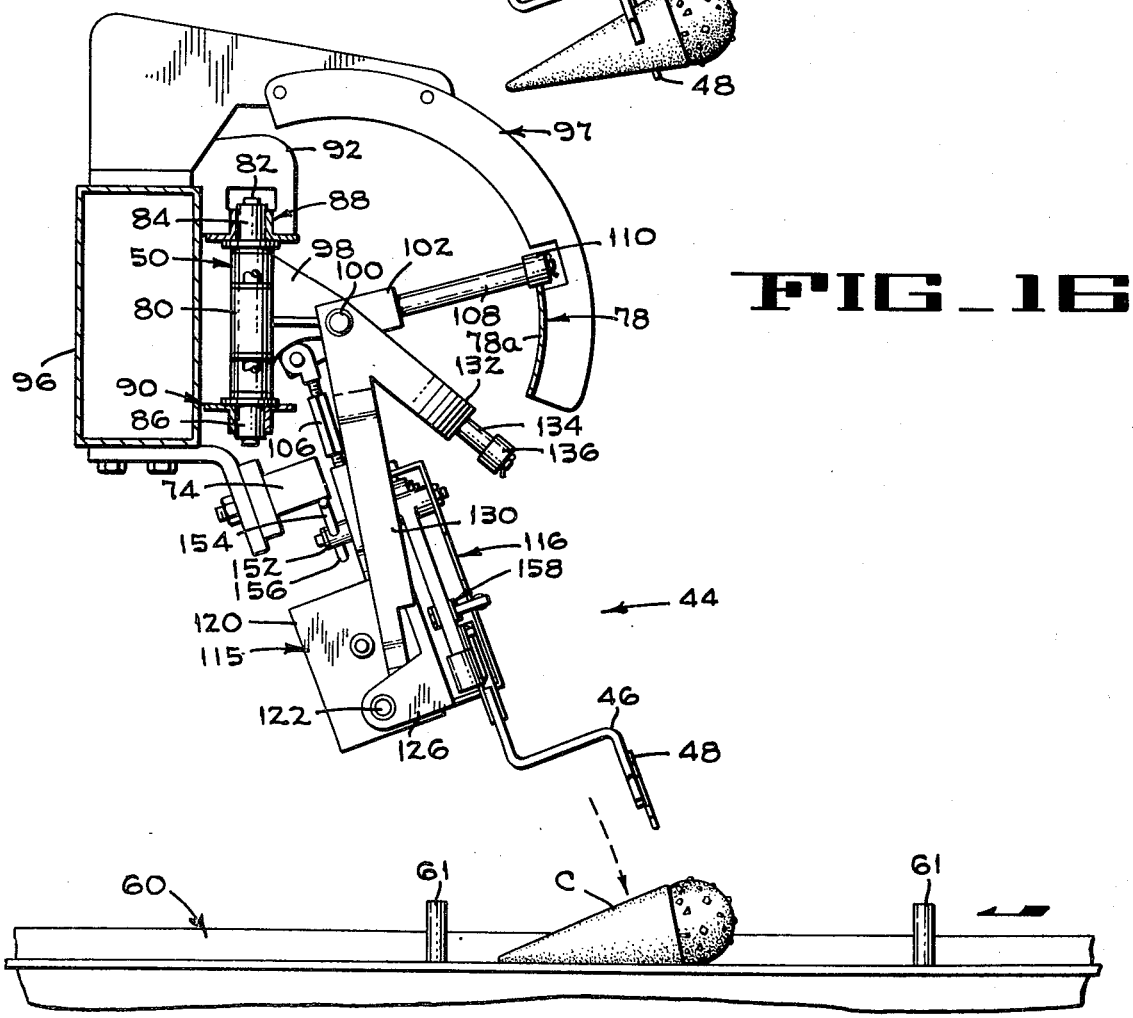
FIG_16

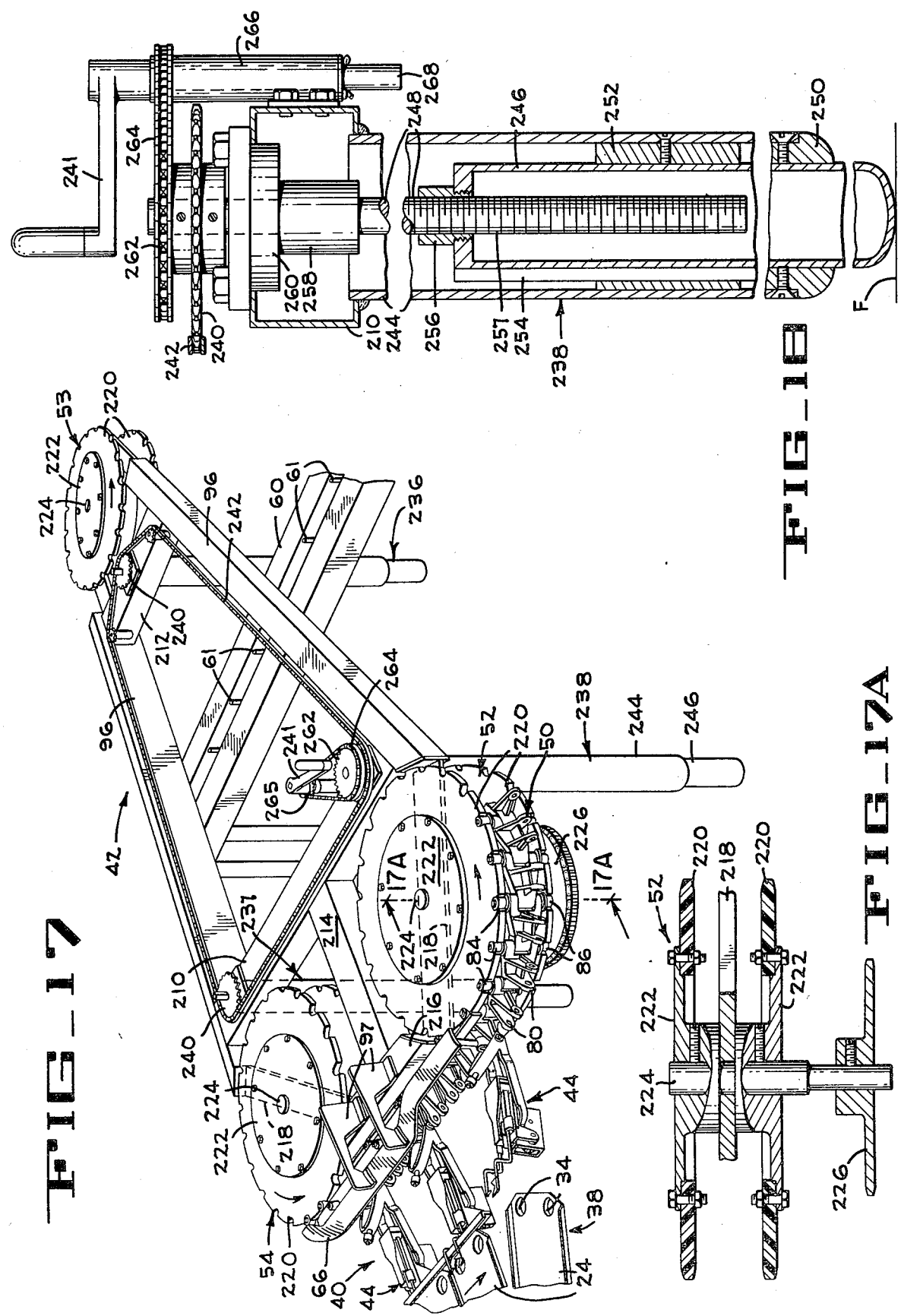

UNIVERSAL GRIPPER ASSEMBLY FOR FROZEN CONFECTIONS

BACKGROUND OF THE INVENTION

In the art of producing frozen confections, machines are now in use to form the confections without molds, in a continuously moving processing line. An extrusion nozzle forms the semi-frozen product as a bar which is sliced off to produce the individual novelties. The bars drop onto a transport conveyor comprising an endless series of support plates which are termed cold plates. The cold plates carry the semi-frozen bars through a freezing tunnel to freeze them solid. The frozen product bars move out of the tunnel on a reach of the transport conveyor which extends along a corresponding reach of a pickup conveyor that carries a plurality of product grippers for picking up the individual products from the cold plates. The product grippers manipulate the individual products through various optional accessory devices along the path of the pickup conveyor, such as a coating bath of liquid chocolate, and a dry coating apparatus for covering the product with ground nuts or similar edible material. One typical confection machine of this general type is disclosed in the Glass U.S. Pat. No. 3,648,625, issued on Mar. 14, 1972, and having the same assignee as the present invention.

One of the factors which limits the adaptability of prior art confection machines to handle different products is that the product grippers for transporting and manipulating the confections are restricted as to the type of product which may be handled. Prior art confection machines, therefore, usually require major accessory or changeover parts to change, for example, from ice cream cones to bar type confections. In contrast to this, the present invention provides product gripper or clamping mechanisms which require only minor and rapidly installed change parts to handle different confections. In this manner, the machine can be quickly altered, after a relatively simple cam change, to produce an entirely different product, such as changing from ice cream cone production to rectangular stick or stickless bar confections, or to ice cream sandwiches, or ice cream cups, or irregularly shaped novelty bars.

SUMMARY OF THE INVENTION

In accordance with the present invention, a gripper carriage assembly includes a universal clamp mechanism provided with product-gripping tongs which may be readily changed according to the product to be handled. Each clamp mechanism is articulated to invert and dip the product into a tank, and into an adjacent dry coater, and then to release the product in a substantially horizontal position onto the input conveyor of a wrapping machine. Different pairs of the replaceable tongs can handle ice cream cones, ice cream cups, stick and stickless novelties, ice cream sandwiches, and a variety of other products.

BRIEF DESCRIPTION OF THE DRAWINGS

FIG. 1 is a schematic plan, partly broken away, showing a moldless frozen confection machine of the continuous or non-stop type.

FIG. 1A is a perspective of a slotted and curved static edge cam which controls moving clamp mechanisms.

FIG. 2 is an enlarged plan, partly in section, of one of a plurality of identical clamp mechanisms, according to the present invention, with the product gripping tongs in open position.

FIG. 3 is a fragmentary plan of the clamping mechanism shown in FIG. 2, with the product-gripping tongs in closed position.

FIG. 3A is an enlarged section taken along lines 3A—3A on FIG. 3.

FIG. 3B is a section along lines 3B—3B on FIG. 3A.

FIG. 3C is an isometric view of the structure shown in FIG. 3A.

FIG. 4 is a side elevation of a gripper carriage assembly including the clamp mechanism shown in FIG. 2.

FIG. 4A is a horizontal section taken along the corresponding section lines shown on FIG. 4.

FIG. 5 is a plan of the FIG. 4 gripper carriage assembly and clamp mechanism.

FIG. 5A is a transverse section taken along lines 5A—5A on FIG. 5.

FIG. 6 is a vertical section taken along lines 6—6 on FIG. 5.

FIG. 7 is an exploded isometric view of the gripper carriage assembly and clamp mechanism shown in FIG 4.

FIG. 8 is an isometric view of the replaceable product gripping tongs used for handling frozen confections with sticks.

FIG. 9 is an isometric view of the replaceable product gripping tongs used for handling plain frozen confections without sticks.

FIGS. 10–16 are sequential operational elevations, indicated by the section lines 10—10 to 16—16 on FIG. 1, showing the overall functions of the gripper carriage assembly and clamping mechanism from the removal of an ice cream cone from the cold plate conveyor to its discharge onto the inlet conveyor of the wrapping machine.

FIG. 13A is a view similar to FIG. 14 and includes a stickless confection instead of a cone.

FIG. 17 is a perspective, partly broken away, of the pickup conveyor.

FIG. 17A is a vertical diagrammatic section taken along lines 17A—17A on FIG. 17.

FIG. 18 is a vertical fragmentary section through one of the conveyor support legs shown in FIG. 17.

DESCRIPTION OF THE PREFERRED EMBODIMENT

General Description

FIG. 1 is an overall schematic plan view of a system for continuously producing frozen confections without using molds, and except as hereinafter noted, comprises cooperating machine elements which are known in the prior art. At the extreme left is shown the common inlet and outlet end of a freezing tunnel 20. A horizontal transport conveyor 22 is comprised of a series of cold plates 24 connected to an endless side chain 26. The inlet reach 28 of the transport conveyor 22 extends under an extruder 30 in which a semi-frozen comestible is extruded, to produce bar type confections, in a descending column through a hot-wire cutoff unit 32. The cutoff unit may be like that shown in the copending Forcella U.S. Patent application Ser. No. 549,264 filed Feb. 12, 1975, and repetitively slices the product bar and deposits one or two slices, according to their size, onto each passing cold plate 24. For producing ice cream cones instead of bars, an operator stationed upstream of the extruder 30 places an empty, upright cone in each of two apertures 34 in each cold plate, and the cones are automatically filled with semi-frozen ice cream by a cone filler unit 36. After the confections are loaded onto the cold plates, they enter the freezing tunnel 20 where they are frozen solid and exit on a reach 38 of the transport conveyor. The reach 38 is provided with a linear end portion which runs parallel to the adjacent reach 40 of a pickup conveyor 42.

For transferring the frozen articles, herein shown as ice cream cones C, to processing stations which are located along runs of the pickup conveyor 42, a gripper carriage assembly 44 becomes laterally aligned with a cone as the gripper travels along the chain reach 40. By means of cam-operated gripping tongs 46 and 48 pivotally mounted on each carriage (FIG. 2) each cone is gripped and lifted from the cold plate 24, thus leaving the cold plates in an unloaded condition for the next cycle. The subject matter of the present invention concerns the gripper carriage assembly 44 and associated tong operating mechanisms, their mode of operation, and particularly their universal application to all of the various previously listed types of products which can be manufactured, by simply replacing the gripper tongs 46 and 48 (FIG. 2) and by making changes in certain operating cams.

The pickup conveyor 42 includes an endless driven chain 50 trained around three sprocket units 52, 53, 54 (FIG. 1) and carrying about eighty-five equally spaced gripper carriage assemblies 44, only a fraction of the total number of gripper assemblies being illustrated. A cone held by tongs pivotally mounted on each gripper carriage assembly 44 proceeds around the sprocket 52 and is (optionally) inverted and dipped in a chocolate bath 56, and in a dry coater 58 for applying ground nuts or the like to the chocolate coating. After passing around the sprocket 53, the gripper carriage assemblies approach the inlet end of a wrapper conveyor 60. Each assembly places its cone in a substantially horizontal position over the wrapper conveyor, and releases the cone onto the conveyor 60 for pickup by a pusher lug 61. The cones are pushed into a wrapping machine 62 where they are individually enclosed in a protective, printed wrapper and discharged to a conveyor 64 leading to a cartoning machine or to attendants who manually carton the packages. As the gripper carriage assemblies 44 return toward the transport conveyor 22, the gripper tongs 46 and 48 are dipped in a wash tank 65 where they are cleaned for the next operating cycle.

Cam System

Before specifically describing one of the gripper carriage assemblies 44 and associated mechanisms, the stationary operating cams for articulating the moving grippers will be briefly mentioned with continued general reference to FIG. 1, and with particular reference to FIGS. 10–15. At the zone of pickup and transfer of the cones from the transport conveyor 22 to the pickup conveyor 42 (See FIGS. 10–12) each gripper carriage assembly passes under an elongate edge cam 66 which swings the gripping tongs 46 and 48 downward into straddling relation with a cone C (FIG. 11), and then upward after the gripping tongs close to resiliently grip the cone (FIG. 2). The gripping tongs are opened by a fixed abutment 67 (FIG. 10) and are closed by another fixed abutment 69 (FIG. 11). As each gripper carriage moves around the sprocket 52, a cam rod 67 acts on cam follower structure to be described presently for holding the cone in an elevated position, as shown in FIG. 13. The cam follower structure is then controlled by a slotted and curved edge cam 68 and as each gripper moves past the chocolate tank 56 and the dry coater 58, the edge cam 68 effects a compound motion to the gripper, which motion sequentially inverts the cone (see FIG. 14) and lowers it into the chocolate tank. The cam 68 then raises the cone to clear the surrounding structure. When the cone C is positioned over the dry coater 58, the cone C is lowered to dip the cone into the dry coater, which is located immediately downstream of the chocolate tank, and is again raised.

As the gripper carriage assembly 44 travels around the sprocket 53 toward the discharge zone to the wrapper conveyor 60, guide rods 70 and 72 (FIG. 10) maintain the cone in a drop off position which position is substantially the position shown in FIG. 15. When the cone is over the wrapper conveyor 60, a fixed abutment 74 (FIG. 16) opens the gripping tongs 46 and 48 (by means to be described) to drop the cone onto the wrapper conveyor 60 between two adjacent pusher lugs 61, and cam follower mechanism on the gripper carriage assembly 44 is engaged with an edge cam 78. The cam 78 (FIG. 1) later causes the traveling tongs to swing downward to a position not illustrated, but one which is similar to that of FIG. 14, whereby the gripping tongs are immersed for cleaning in the wash tank 65 (FIG. 1). The tongs are then swung upward to their initial FIG. 10 position for the next operating cycle.

Pickup Conveyor Chain

The chain 50 (FIG. 1) of the pickup conveyor 42 is best illustrated in FIG. 7 and comprises a series of special link castings 80 that are pivotally interconnected by upright chain pins 82. The upper and lower projecting ends of the chain pins are provided with rollers 84 and 86 which, as shown in FIGS. 11–15, are guided in upper and lower track assemblies 88 and 90, respectively, that are hung by brackets 92 and 94 from a fixed tubular frame member 96. The previously mentioned edge cams 66, 68 and 78 are similarly supported from the frame tube 96 by brackets 97. The rollers 84 and 86 are engaged, intermediate the track assemblies 88 and 90, by the sprocket units 52, 53 and 54, each of which has two vertically separated sprocket units, as seen in FIG. 10 for the sprocket unit 54, in order to stabilize the links 80 in upright position.

Tong Swinging Apparatus

The means for swinging the tongs 46, 48 from their upper position shown in solid lines in FIG. 6, to their lower position shown in phantom lines in that figure will now be described.

Returning to FIG. 7, each link casting 80 is provided with a pair of lateral arms 98 having aligned apertures which each mount an individual pivot pin 100 as shown in FIG. 2. Mounted on the two pins 100 and located between the arms 98 is a yoke 102 (FIGS. 4–6) a lower leg of which forms a lever arm 104 that is connected by a pin 105 to a link 106, the length of which is adjustable. An upstanding rod 108 connected to the yoke 102 carries a cam follower roller 110 which contacts the previously mentioned cams as the gripper is carried around the pickup conveyor 42. Thus, the link 106 (FIG. 6) moves endwise between the solid line and phantom line positions, and oscillates a gear 112 to which the other end of the link 106 is connected by a stub shaft 114. As later described, the gear 112 is carried on a pivotable carriage support member 115. Oscillation of the gear 112 swings a mounting frame 116 for the gripper tongs 46 and 48, between the full and phantom line positions thereof in FIG. 6, relative to the carriage support member 115. For this purpose, the gear 112 is meshed with a pinion gear 118 that serves to oscillate or swing the gripper tong frame 116.

Means for supporting the gears 112 and 118 (FIG. 6) include a gear box 120 which is closed except at the end adjacent the gear 118. As shown in FIG. 4A, the gear 112 rotates freely on a shaft 121, and the meshing gear 118 has a sleeve 119 that is connected to a shaft 122. The projecting ends of shaft 122 each mount a collar 124 that is locked to the shaft by a through-bolt 125. One bolt 125 also locks the sleeve 119 of the gear 118 to the shaft 122. In turn, the collars 124 are each welded to an ear 126 (FIG. 4) which ears depend from the lower portion of the gripper tong frame 116. Thus, when the large gear 112 (FIG. 6) is oscillated through a short stroke, it oscillates the pinion gear 118 through a larger stroke and the pinion shaft 122 swings the gripper tong frame 116 about the axis of the shaft 122, as earlier mentioned. It will be noted in FIGS. 6 and 7 that one upper end of the gear box 120 is provided with an upstanding tab 128 which forms a mechanical stop for limiting counterclockwise pivotal movement of the gripper tong frame 116 about the axis of the shaft 122.

The same pivot pins 100 (FIG. 2) that are carried by the link castings 80 (FIG. 7) also provide pivotal support for the gear box 120. For this purpose, each pivot pin 100 pivotally supports an outwardly extending support link 130 that is part of the carriage support member 115. As shown in FIGS. 5 and 7, the links 130 are interconnected by an integral U-shaped strap 132 which is provided with a projecting shaft 134 carrying a roller 136, maintained on the shaft by a cotter pin. Roller 136 is manipulated by the previously mentioned edge cams on the pickup conveyor 42 to swing the links 130 up and down about the axes of the pivot pins 100. The outer end portions of the links 130 are bent inward (FIGS. 5 and 7) and welded to the gear box 120, and the upper edge of each link along the bend area is vertically relieved at 138 to provide lateral clearance for gripper tong mounting arms 140 and 142 (FIG. 2) when the respective gripper tongs 46 and 48 are in the open position shown in FIG. 2.

As thus far described, it will be seen that each gripper mechanism 44 is mounted on the carriage support member 115 by links 130 for up and down swinging movement about the axes of the pivot pins 100, and that the gripper tongs 46 and 48, being mounted directly on the gripper tong mounting frame 116, are pivotable up and down about the axis of the pinion gear shaft 122 relative to the support links 130 when the frame 116 is oscillated by the gears 112, 118 (FIG. 6). Thus the carriage support member 115 raises and lowers the tongs as seen in FIGS. 10, 11 and 17, whereas the tong mounting frame 116 inverts the tongs, as seen in FIGS. 6 and 13.

Tong Closing Apparatus

To open and close the gripper tongs 46 and 48 (FIG. 2) they are pivotally mounted in the tong mounting frame 116. Their respective mounting arms 140 and 142 have hub portions which are pivotally mounted on pivot bolts 144 and 146. The bolts extend through a base plate 148 and a top plate 150 (FIGS. 5, 5A and 6) of the tong mounting frame 116, which plates support the linkage for opening and closing the tong mounting arms. As best seen in FIG. 5A, the hub 146a for the tong mounting arm 142 and a striker arm hub 152 under the base plate 148 are mounted on the common pivot bolt 146. As will be seen, the striker arm link 152 is part of a mechanism that opens and closes the tongs. Hubs 146a and 152 are independently rotatable on the bolt 146, which bolt, like the pivot bolt 144, is locked against rotation in the plate 150 by a nut 153. The lower end portion of the hub 152 has opposed striker arms 154 and 156 (FIG. 2), one or the other of which contacts the previously mentioned abutments 67 (FIG. 10), 69 (FIG. 11) and 74 (FIG. 16) to operate a toggle linkage for opening and closing the gripper tongs 46 and 48.

The gripper tong toggle linkage is shown at 158 in FIGS. 2, 3, 5A and 6. Striker arm hub 152 (FIG. 5A) is provided with an upwardly curved driver arm 160 the upper end of which is pivotally connected to one end of a toggle drive-link 162. As seen in FIGS. 2 and 3, the toggle drive link 162 extends centrally along the gripper tong mounting frame 116, the base plate 148 being provided with a clearance slot 163 (FIG. 2) for accommodating swinging movement of the driver arm 160. The toggle drive link 162 is connected by a pivot pin 164 to laterally extending, opposed pairs of toggle links 166 and 168, each pair of links vertically straddling the toggle drive link 162 as shown in FIG. 6. A slot 169 (FIG. 5) in the top plate 150 guides the pivot pin 164 and limits the movement of the pin when the toggle links 166 and 168 move to their FIG. 2 over-center positions. The base plate is also provided with a guide slot for receiving the lower end portion of the pivot pin 164. The outer end portions of the toggle links 164 and 166 (FIGS. 2–6) are respectively connected to the gripper tong mounting arms 140 and 142 by pivot pins 170 and 172 which extend above a narrowed section of the top plate 150 (FIG. 5) and are interconnected by a tension spring 174.

When the toggle drive link 162 (FIG. 2) is moved to the left by reason of the striker arm 156 impinging the fixed abutment 69 (FIG. 11) the pivot pin 164, which interconnects the toggle links 166 and 168 and the toggle drive link 162, moves to the left as shown in FIG. 5 along the slot 169, and the toggle spring 174 collapses the toggle links to the position shown in FIG. 3. This action takes place when the tongs reach a position along the intermediate portion of the cam 66 (FIG. 1) and a position between those shown in FIGS. 11 and 12. In order to limit the endwise movement of the toggle drive link 162 when the toggle links 166 and 168 collapse, an end wall 171 (FIG. 2) of the gripper tong frame 116 is provided with an adjustable stop screw 173 which is contacted by the adjacent end of the toggle drive link 162.

As the toggle links collapse, the gripper tong mounting arms 140 and 142 swing toward each other, thus closing the gripper tongs 46 and 48 and maintaining a gripping force therebetween from the energy of the spring 174. Conversely, when the striker arm 154 (FIGS. 3 and 10) strikes the fixed abutment 67, the toggle drive link 162 moves to the right to the FIG. 2 position, thus opening the gripper tongs 46 and 48 and placing the toggle links 166 and 168 in an over-center position which is maintained by the toggle spring 174. This action takes place when the tongs reach the position indicated by the section lines 10—10 on FIG. 1. Thus, the striker arm 154 positively opens the gripper tongs, and the striker arm 156 passively closes the gripper tongs. Further, the open or closed condition of the gripper tongs is maintained by the toggle-action linkage until the opening striker arm 154 strikes the tong-opening abutment 67 (FIG. 10) or 74 (FIG. 16), or the closing striker arm 156 contacts the tong-closing abutment 69 (FIG. 11). The gripping force between the closed tongs is provided by the toggle spring 174.

Tong Mounting

According to the present invention, a feature of the gripper carriage assembly 44 is that the gripping tongs 46 and 48 may be replaced with tongs for handling other products, entirely without tools. Before describing this feature, it should be noted that the free ends of the gripping tongs 46 and 48 (FIGS. 5 and 7) for handling ice cream cones are respectively provided with a cooperating prong 180 and a yoke 182, having an inner sharpened edge, which are vertically offset by shanks 184 and 186 (FIGS. 4 and 5) a substantial distance, as shown in FIGS. 10–12, from the tong mounting shanks 187, 188, but the tongs are just above the plane of the cold plate 24 when they are lowered (FIG. 11). The reason that the gripping tongs are offset and not planar (referring to the FIG. 11 pickup position) is that the offset in the tongs is necessary for clearance between the cone C (FIG. 14) and the overhead gripper structure when the cone is inverted for dipping or coating.

Since the cone gripping tongs must be vertically offset as described in order to invert the cone for dipping or coating, this offset requires that the cold plates 24 be correspondingly raised above the plane of the tong mounting shanks 187, 188, as shown in FIG. 11. Thus when handling cones, the cold plates 24 are also disposed above the plane of the conveyor chain 50 which carries the grippers 44. As will be later described, the pickup conveyor 42 is vertically adjustable to change the amount of offset from the cold plates when other gripping tongs for different products are used.

FIGS. 3A, 3B and 3C illustrate the manner in which the gripping tongs 46 and 48 may be dismounted, and replaced with other gripping tongs, such as those shown in FIGS. 8 and 9 for handling a different product. In the case of the gripping tongs 46a and 48a (FIG. 8) the gripping elements are arranged to grasp the stick S of a frozen confection bar B, and the gripping action is obtained with notched, interdigitating teeth 188. For stickless novelty bars SB (FIG. 9) the lower confronting prongs 190 of staple-like wires 192 on gripping tongs 46b and 48b are arranged to penetrate the side surfaces of the bars.

In all cases, the mounting ends of the gripping tongs 46 and 48, 46a and 48a, and 46b, 48b are of identical construction and include angle bars 194 and 196 of opposite orientation. Near the end of each angle bar is a fixed dowel pin 198 penetrating the flange of the angle bar and projecting both above and below the flange. An adjacent fixed dowel pin 200 depends from the angle bar. As shown in FIG. 3C for the gripper tong mounting arm 140, two through apertures 202 are provided for the dowel pins, which seat therein as shown in FIG. 3A. A separate spring steel locking clip 204 (FIG. 3C) of C-shaped section, having an elongate upper leg 206 with an aperture, is arranged to clip the angle bar 194 onto the mounting arm 140. The locking clip is installed by placing the apertured portion over the dowel pin 198 with the parts disposed as shown in FIG. 3C, and then swinging the free end of the clip toward the gripper tong so that the C-shaped end portion of the clip springs over the angle bar flange and mounting arm, as shown in FIG. 3B. The locking clip 205 (FIGS. 2 and 3) for the other gripping tong is of opposite geometrical configuration to the clip 204, and is mounted in the same manner.

With the described interchangeability of the gripper tongs to suit the product, the gripper carriage assemblies 44 have universal application, and the processing line can be easily and rapidly converted for use from one product to another. However, it will be noted that a bar type confection, such as the bar SB in FIG. 13A, only requires turning 90 degrees from the FIG. 11 pickup position to be vertical for coating and dipping, while the cone C, FIG. 11, must be turned 180 degrees to be vertical. Thus, the edge cam 68 (FIGS. 13 and 14) which controls pivotal movement of the gripper tongs also has to be replaced by an edge cam 68a (FIG. 13A) when changing from cones to bars.

Elevation Adjustment of Pickup Conveyor

It was previously mentioned that the pickup conveyor 42 (FIG. 1) is adjustable to set the height of the gripper carriage assemblies 44 relative to the cold plates. As previously mentioned, the tongs for cones have a substantial offset, and hence when straight tongs are employed for bars, etc. it is necessary to raise the pickup conveyor relative to the cold plates. Another reason for providing an elevational adjustment of the pickup conveyor is that the gripping tongs 46b, 48b, FIG. 9, for bar type confections will have universal utility for any thickness of bar. Thus it is possible to vertically adjust the plane of the tongs in their product pickup position so that the prongs 190 penetrate the sides of the bar SB at about mid-height, which is the preferable location of the prongs during gripping. This obviates the need for changing the entire set of gripper tongs (about 170 total) to provide another set of tongs which have their prongs in a different plane. Similarly, by vertically adjusting the horizontal plane of the grippers, the same tongs 46a, 48a, FIG. 8, can be used for stick type novelties of different thickness because the sticks are centrally located in the bars and a change in thickness of the bar will relocate the vertical position of the sticks on the cold plates.

Another advantage of the vertical adjustment capability for the gripper carriage assemblies 44 is that the gripping tongs for bars, etc. as shown in FIGS. 8 and 9 can have a simple straight shank construction and require no offset shanks similar to the shanks 184 and 186 (FIG. 7) for the cone-type of gripper tongs. In regard to the straight tongs and the offset tongs, it will be noted by comparing FIGS. 13A and 14 that the dry coater 58 (FIG. 14) must be repositioned laterally outward for dipping the stickless bar SB of FIG. 13A since cones are turned 180 degrees to invert them, and the stick and stickless bars are turned only 90°. Thus, the depending bars are laterally outward of the position of the inverted cones and the dry coater as well as the chocolate tank and wash tank can be laterally positioned to handle either product.

As seen in FIG. 17, the longitudinal pickup conveyor frame tubes 96 shown in FIGS. 10–16 extend along each reach of the chain 50 between the dual sprocket 53 and the dual sprockets 52 and 54. The tubes 96 are interconnected by a front lateral tube 210 and a rear lateral tube 212. These tubular members form a trapezoidal main pickup conveyor frame, which is provided with cantilever frame members. A tube 214 projects from the lateral tube 210, and carries a cross tube 216 which directly supports the brackets 97 that mount the cam 66. Each end of the tube 216 is secured to a sprocket support plate 218 extending diagonally to the end of the adjacent frame tube 96. As shown in FIG. 17A for the dual sprockets 52, each sprocket is formed of a toothed plastic ring 220, bolted to a driven hub 222. The hubs straddle the support plate 218 and are mounted on a driveshaft 224 which is driven, by means including a drive sprocket 226, in timed relation to the cold plate conveyor 28. The dual sprocket 53 at the other ends of the tubes 96 is of similar construction, and is similarly supported.

Three telescopically adjustable legs, of similar construction, support the pickup conveyor frame; one leg 236 is centrally located along the rear lateral frame tube 212, and the other two legs 237 and 238 are located at each end portion of the front lateral frame tube 210. In the manner to be described presently, three sprockets 240, one per leg, are simultaneously rotated by a hand crank 241 which operates a chain 242 that is trained around all three of the sprockets 240, to simultaneously increase or decrease the effective lengths of the legs 236, 237 and 238.

FIG. 18 is a section through the leg 238 which is adjacent the hand crank 241. The leg includes an upper outer leg tube portion 244, a lower inner leg tube portion 246, and an axially fixed, threaded central adjustment rod 248 which is threaded into the inner leg tube 246. The lower end of the inner leg tube 246 is supported on the floor F, and is guided for endwise movement relative to the outer leg tube 244 by a lower guide bushing 250 fixed to the lower end of the outer tube 244, and by an intermediate bushing 252 mounted in fixed position inside the outer leg tube. In order to prevent relative rotation between the inner and outer leg tubes, the bushing 252 is provided with a longitudinal keyway which slidably receives a key 254 that is fixed on the outer surface of the inner leg tube 246.

The upper end of the inner leg tube carries a fixed nut 256 which is in threaded engagement with a threaded portion 257 of the rod 248. Above the nut, the rod is provided with a hub 258 in endwise engagement with a thrust bearing 260. The bearing 260 is bolted to the frame tube 210, the lower wall of which is apertured and has welded thereto the upper end of the outer leg tube 244. Above the hub 258, the rod 248 extends through, and is secured to both the hub of the sprocket 240, and the hub of an upper sprocket 262 which is part of a chain and sprocket drive unit 264 that includes a small sprocket 265 (FIG. 17) on the hand crank 241. The drive unit also includes a bearing tube 266 bolted to the frame tube 210 for rotatably mounting the shaft 268 to which the hand crank 241 is attached.

With the described construction, turning the hand crank 241 screws the adjustment rod 248 into or out of the nut 256 on the inner leg tube 246 and thus shortens or lengthens the effective length of the leg 238 and lowers or raises the frame of the pickup conveyor 42. Since the chain 242 simultaneously turns a similar adjustment rod in each of the other two legs 236 and 237, the entire pickup conveyor and the product grippers 44 move unitarily to the desired elevational position. During installation of the pickup conveyor, the conveyor can be leveled on an uneven floor by individually adjusting the legs before the chain 242 is installed. Thus, future elevational adjustments by turning the hand crank 241 after the chain 242 is coupled to the sprockets 240 alter the height, but not the level condition of the pickup conveyor.

Operation

Although the general operating principles of the product gripper carriage assemblies 44 have been referred to throughout the preceding description, the following summary thereof together with reference to FIGS. 10–16 is presented to review the sequence of functions effected by each gripper, and also to explain certain operating conditions not previously brought out.

FIG. 10, as indicated by the section lines on FIG. 1, shows a gripper carriage assembly 44 which has just moved into lateral alignment with a cone C that has left the freezing tunnel 20. At this time the gripping ends of the tongs 46 and 48 have previously been opened by the striker arm 154 moving past the abutment 67, and the tongs are inclined upwardly over the cone by a cam rod 66a which precedes the cam 66 and extends around the sprocket 54. It will be noted that the cam follower roller 136 for swinging the support frame 131 is not engaged with a cam. This condition results from the manner in which the gears 112 and 118 (FIG. 6) operate. Thus, if the cam follower arm 108 is pushed counterclockwise about the axes of the pivot shafts 100 by the edge cam 66, as is the case in FIG. 10, the gear link 106 urges the gear 112 clockwise, the pinion gear 118 counterclockwise, and causes the gripper tong mounting frame 116 to be urged in the latter direction about the axis of the gear shaft 122 and to seat upon the tab 128 on the gear box 120. It is apparent, therefore, that in FIG. 10 the cam 66 and the follower roller 110 support the gripper carriage assembly 44 because the gripper tong mounting frame 116 cannot rotate relative to the carriage support 115.

Between the FIG. 10 and 11 positions, the active edge of the cam 66 follows a generally helical path about the axes of the pivot pins 100, and allows the follower roller 110 to move about those axes toward the cone C. Thus, gravity lowers the gripper carriage assembly 44 and the tongs to the FIG. 11 position wherein the gripper ends of the tongs 46 and 48 lie horizontally above the cold plate 24 and in straddling relation with the cone C. The striker arm 156 is now in horizontal alignment with the fixed abutment 69 which will close the gripper tongs 46 and 48 (by collapsing the toggle links 166 and 168 as shown in FIGS. 3 and 5) and allow the spring 174 to pull the gripper tongs together to grasp the moving cone C.

In FIG. 12, the gripper tongs have been seated against and are gripping the cone as above described, and the cam 66 is moving the follwer roller 110 back toward its FIG. 10 position, thus elevating the gripper carriage assembly 44 and hence the tongs. The gears 112 and 118 (FIG. 6) remain as earlier described, keeping the gripper tong frame 116 in the same relative position with the support arms 130 of the carriage support frame 115. This lifting of the cone C continues until, in a non-illustrated position, the cone has been lifted clear of the cold plate 24 and that particular gripper carriage assembly 44 starts to travel around the sprocket 52 (FIG. 1). At this location, the guide rod 67 provides support for the cam follower roller 110. Subsequently, the cam 68 lowers the gripper assembly to the FIG. 13 position, which is substantially the same as the position shown in FIG. 12. At the inlet end 270 of the cam assembly 68 (FIG. 1A), the cam follower roller 136 for the carriage support frame 115 enters a cam slot 272 and the cam follower roller 110 enters a cam slot 274 for the purpose of providing relative angular displacement between the cam follower rollers 136 and 110, as next described.

In FIG. 14 the cone C is inverted to a vertical position for dipping in a chocolate bath in the chocolate tank 56 by a compound motion of the gripper carriage assembly 44, which motion is caused by swinging both cam follower rollers 110 and 136 clockwise about the axes of the pivot shafts 100, and by angularly displacing the rollers toward each other. Thus, the cam slots 272 and 274, as shown in FIG. 1A, begin to converge at the inlet end of the cam 68 to swing the carriage support frame 115 downward, while the gears 112 and 118 (FIG. 6) rotate the gripper tong mounting frame 116 clockwise about the axis of the gear shaft 122. Therefore, as the angular distance between the cam follower rollers 110 and 136 (FIG. 14) diminishes, the gear link 106 (FIG 6) rotates the gear 112 counterclockwise, which in turn rotates the pinion gear 118 clockwise. The gripper tong frame 116 is thereby pivoted clockwise about the gear shaft 122 so that the gripper tongs 46 and 48 move the cone C to an inverted, upright position. Referring to FIG. 1A, the inverted position for the cone C is attained when the follower rollers 110 and 136 (FIG. 14) are approximately at the point indicated by the arrow 276. From this point, the cam slots 272 and 274 retain the same general spacing, but descend to a lowermost point at arrow 278; this lowers the gripper carriage assembly 44 so that the ice cream portion of the inverted cone is dipped into the liquid chocolate bath in the chocolate tank 56. At the general location of the arrow 280 (FIG. 1A) the cam slots 272 and 274 rise to elevate the cone C clear of the chocolate tank. The next following cam track section included in the bracket 282 can be removed, by means not shown, if the dry coater 58 is not required. In the present case, the cam slots descend at the arrow 284 to place the inverted cone C (FIG. 14) into an elongate slot 286 formed in the upper wall of the dry coater so that the ground nuts or the like in the dry coater adhere to the molten chocolate.

The linear sections of the cam slots 272 and 274 (FIG. 1A) indicated by the arrow 288 thus correspond to horizontal travel of the inverted cone C while the cone is being coated with material in the dry coater. If the dry coater 58 is not required for a particular installation, the cam section 282 is replaced with another cam section having linear horizontal slots aligned with the slots at the area indicated by the arrow 280. This causes each gripper carriage assembly 44 to travel over the dry coater without lowering the inverted cone for dripping. In the present instance, the cam slots rise at the location of the arrow 290 so that the inverted cone is lifted to clear the downstream end of the dry coater 58.

Immediately downstream of the dry coater, the cam slots 272 and 274 diverge and rise, in the area indicated by the arrow 292, which causes the cone C (FIG. 14) to revert to its upright FIG. 13 position by a swinging movement of the tong mounting frame 116 relative to the carriage support member 115; the latter member remains in a depending position substantially the same as is shown in FIG. 14. The gripper carriage assembly 44 must now be lowered toward the position shown in FIG. 15 with the cone C substantially horizontal, and these movements are effected by a downwardly curved end section 294 (FIG. 1A), the upper edge of which supports the cam follower roller 110 to allow gravity to lower the carriage support member 115. The other cam follower roller 136 is free. Thus, the guide rods 70 and 72 (FIG. 1) maintain the carriage assembly 44 in the approximate position shown in FIG. 15 as the carriage moves around the sprocket 53. Thus, after the carriage assembly 44 encounters the cam 78 (FIG. 1) only the cam follower roller 110 is supported, and the cone C approaches its discharge position over the wrapper conveyor 60 (FIGS. 1 and 16).

Retaining the FIG. 15 orientation, the gripper assembly 44 (FIG. 16) carries the striker arm 154 past the fixed abutment 74 to open the gripper tongs 46, 48 and the cone C drops onto wrapper conveyor 60 between two adjacent pushers 61. The trailing pusher then overtakes and pushes the frozen ice cream end of the cone to propel the cone into the wrapping machine 62 (FIG. 1). The cam 78 (FIG. 1) comprises, between the ends of the guide rods 70, 72 and the wash tank 65, a generally linear section 78a (FIG. 15) which is oriented nearly vertical. Thus, a gripper assembly 44, while traversing the cam section 78a, is supported by its cam follower roller 110 (as previously described in connection with FIG. 10) riding on the upper edge of the cam section 78a, both before and after the cone C is discharged. The carriage support member 115 retains the illustrated position until it nears the wash tank 65.

Adjacent the wash tank 65 (FIG. 1) the cam section 78a cooperates with other non-illustrated cams, and with a cam section 78b, to trap both cam follower rollers 110 and 136 (FIG. 14) in a manner similar to that already described in connection with the cam 68 (FIG. 1A). The cam follower rollers 110 and 136 are then relatively displaced to dip the tongs 46 and 48 in a cleaning liquid in the wash tank 65. Thus, at the wash tank 65, the carriage support member 115 is raised to a position similar to that which is shown in FIG. 13, and the gripper tong mounting frame 116 is inverted to the approximate position shown in phantom lines in FIG. 6 by causing the cam follower rollers 110 and 136 to be moved toward each other. After the tongs are washed, the cam 78 manipulates the cam follower rollers to orient the components of the gripper carriage assembly 44 substantially as shown in FIG. 10 for the next operating cycle.

With reference to FIG. 13A, and the gripper tongs 46b, 48b (FIG. 9) when a bar type of confection is handled, the bar SB is picked up from a horizontal position on the cold plate and need only be reoriented 90° from that position for dipping and coating operations. Thus, a different edge cam 68a positions the cam follower rollers 110 and 136 in the same manner as the cam 68 (FIG. 13), but limits the angular separation of the cam follower rollers 110 and 136 such that the gears 112 and 118 (FIG. 6) turn the gripper tong frame 116 only 90° about the gear shaft 122.

It is believed evident from the preceding description of a preferred embodiment of the present invention that the gripper assemblies 44 provide means for handling a variety of different shapes and sizes of frozen confections, in different production runs with the same confection handling machine, primarily by only replacing the gripping tongs. In its broadest aspect, the offset shanks 184 and 186 of the gripping tongs 46 and 48 for handling ice cream cones may be eliminated if dimensional changes are made to provide clearance for inverting the cones for dipping. Thus, all types of gripping tongs may have straight shanks, as shown for the tongs in FIGS. 8 and 9, and this will in turn eliminate the height adjustment mechanism for the pickup conveyor 42. The height adjustment feature, however, is valuable because it allows for a precise positioning of the gripping tongs relative to the cold plates 24, and eliminates the need of changing the tongs for various thicknesses of stick-type confections, as was described earlier.

Although the best mode contemplated for carrying out the present invention has been herein shown and described, it will be apparent that modification and variation may be made without departing from what is regarded to be the subject matter of the invention.

What is claimed is:

1. Apparatus for transferring frozen confections from a continuously moving transport conveyor to an adjacent continuously moving pickup conveyor comprising:
    a. a carriage assembly mounted on said pickup conveyor for translational movement in a substantially horizontal plane;
    b. said carriage assembly including a support member for pivotal movement on said conveyor about a substantially horizontal axis;
    c. said carriage assembly including a tong mounting frame which is pivotally mounted on said support member for movement about substantially horizontal axis that is spaced outwardly from said carriage assembly axis;
    d. a pair of frozen confection gripping tongs pivotally mounted on said tong mounting frame about pivot axes which are normal to said horizontal axes for opening and closing movement of the free ends of each tong;
    e. means for pivoting said carriage assembly about its pivot axis on said pickup conveyor for lifting frozen confections from said transport conveyor; and
    f. means for independently swinging said tong mounting frame about its pivot axis on said support member after the tongs have moved clear of said transport conveyor for lowering and raising the free ends of said tongs.

2. Apparatus according to claim 1 wherein said tongs are initially substantially horizontal to grip a confection on said transport conveyor;
    a. said means for independently swinging said tong mounting frame on said support member rotating said frame and the tongs mounted thereon to swing said frame down about 90° so that the tongs depend substantially vertically along a portion of the path of said pickup conveyor.

3. Apparatus according to claim 1 wherein said tongs are initially substantially horizontal to grip a confection on said transport conveyor; said means for independently swinging said tong mounting frame on said support member swinging said frame and the tongs mounted thereon substantially 180° so that the tongs extend substantially horizontally beneath said pickup conveyor along a portion of the path of said pickup conveyor.

4. Apparatus according to claim 1, and
    a. a pair of toggle links having a common pivot, said links pivotally interconnecting said gripping tongs;
    b. cam means along the path of said pickup conveyor for operating said toggle links to open the tongs; and
    c. a tension spring connected between said tongs for closing said tongs, the common pivot of said toggle links being positioned overcenter when said tongs are opened so that the tongs remain open until said toggle links are retracted from their overcenter position.

5. Apparatus according to claim 4 and a drive link connected to one end to the common pivot of said toggle links;
    a. a driver arm hub pivotally mounted on said tong mounting frame; said hub having a driver arm pivoted to the other end of said drive link;
    b. a striker arm extending radially from said hub; and
    c. a fixed abutment along the path of said pickup conveyor for engagement by said striker arm during translational movement of said carriage in order to retract said toggle links and allow said tension spring to close said tongs.

6. Apparatus according to claim 5 and a second striker arm on said hub circumferentially spaced from the first striker arm and extending radially from the pivot axis of said hub; and
    a. another fixed abutment along the path of said pickup conveyor for engagement by said second striker arm for extending said toggle links against the force of said spring to open said gripping tongs during translational movement of said carriage assembly.

7. Apparatus according to claim 1 and a first gear mounted on the support member of said carriage assembly;
    a. drive means for turning said first gear;
    b. means disposed along the path of said pickup conveyor for operating drive means to turn said first gear relative to said carriage; and
    c. a second gear on the pivot axis of said tong mounting frame and being connected to the tong mounting frame; said second gear being meshed with the first gear for swinging said frame so that the gripping tongs are reoriented without affecting the orientation of said carriage assembly support member.

8. Apparatus according to claim 1, wherein each of said gripping tongs if formed of longitudinally aligned, separable inner and outer sections, the inner section of each tong being pivotally mounted on said tong gripping frame, the outer section including confection-engaging elements on its distal end, a pair of dowel pins on the inner end portion of said outer section and received in matching dowel holes formed in said inner section, and a spring clip for resiliently gripping the overlapping portions of said inner and outer sections.

9. The apparatus of claim 8, wherein said spring clip is pivotally mounted on one of said dowels and has a C-shaped body portion for gripping said tong sections.

10. Apparatus according to claim 1, wherein said gripping tongs are substantially horizontal when in position to grip a confection from said transport conveyor, and gear means connected between said carriage assembly support member and said tong mounting frame for swinging said tong mounting frame about its horizontal axis for dipping a confection gripped by the tongs.

11. Apparatus according to claim 1 and means for adjusting the height of said pickup conveyor relative to said transport conveyor, said means comprising a plurality of legs each having an inner and outer tube in telescopic relation, an axial screw connected between said tubes, the rotative position of said screw determining the effective length of said leg, and a chain and sprocket drive train connecting all of the leg screws for simultaneous height adjustment of said pickup conveyor.

\* \* \* \* \*

UNITED STATES PATENT OFFICE
CERTIFICATE OF CORRECTION

PATENT NO. : 3,985,223
DATED : October 12, 1976
INVENTOR(S) : PETER W. FORCELLA et al It is certified that error appears in the above-identified patent and that said Letters Patent are hereby corrected as shown below:

In the Abstract, line 22, insert --cones-- after "ice cream".

Col. 4, line 15, change "(Fig. 10)" to --(Fig. 1)--.

Col. 8, line 19, change "can" to --cam--.

Col. 11, lines 21 and 22, change "(FIG 6)" to --(FIG. 6)--.

Signed and Sealed this

Third Day of May 1977

[SEAL]

Attest:

RUTH C. MASON
Attesting Officer

C. MARSHALL DANN
Commissioner of Patents and Trademarks